US008881099B2

(12) United States Patent
Gallagher

(10) Patent No.: US 8,881,099 B2
(45) Date of Patent: Nov. 4, 2014

(54) DYNAMIC GENERATION OF WRAPPER CLASSES TO IMPLEMENT CALL-BY-VALUE SEMANTICS

(75) Inventor: William John Gallagher, Easton, PA (US)

(73) Assignee: Oracle International Corporation, Redwood Shores, CA (US)

( * ) Notice: Subject to any disclaimer, the term of this patent is extended or adjusted under 35 U.S.C. 154(b) by 1439 days.

(21) Appl. No.: 10/938,963

(22) Filed: Sep. 10, 2004

(65) Prior Publication Data

US 2006/0107222 A1    May 18, 2006

(51) Int. Cl.
*G06F 9/44* (2006.01)
*G06F 9/54* (2006.01)

(52) U.S. Cl.
CPC ............. *G06F 9/548* (2013.01); *G06F 9/541* (2013.01)
USPC ....................................... 717/108

(58) Field of Classification Search
None
See application file for complete search history.

(56) References Cited

U.S. PATENT DOCUMENTS

| | | | |
|---|---|---|---|
| 4,989,132 A * | 1/1991 | Mellender et al. ............ 717/139 |
| 5,408,405 A * | 4/1995 | Mozumder et al. ............ 700/31 |
| 5,815,415 A | 9/1998 | Bentley |
| 6,006,230 A * | 12/1999 | Ludwig et al. ........................ 1/1 |
| 6,011,917 A * | 1/2000 | Leymann et al. ............ 717/104 |
| 6,011,918 A | 1/2000 | Cohen |
| 6,085,030 A | 7/2000 | Whitehead |
| 6,085,198 A | 7/2000 | Skinner |
| 6,125,383 A | 9/2000 | Glynias |
| 6,151,639 A * | 11/2000 | Tucker et al. ................. 719/316 |
| 6,321,261 B1 | 11/2001 | Glass |
| 6,381,737 B1 | 4/2002 | Click |
| 6,385,661 B1 | 5/2002 | Guthrie |
| 6,389,452 B1 | 5/2002 | Glass |
| 6,415,315 B1 | 7/2002 | Glass |
| 6,442,586 B1 | 8/2002 | Glass |
| 6,513,157 B1 | 1/2003 | Glass |
| 6,519,653 B1 | 2/2003 | Glass |
| 6,535,928 B1 | 3/2003 | Glass |
| 6,549,955 B2 | 4/2003 | Guthrie |
| 6,578,191 B1 * | 6/2003 | Boehme et al. ............... 717/107 |
| 6,622,175 B1 | 9/2003 | Piller |
| 6,629,128 B1 | 9/2003 | Glass |
| 6,678,743 B1 | 1/2004 | Glass |
| 6,834,389 B1 | 12/2004 | Glass |

(Continued)

OTHER PUBLICATIONS

Sun Microsystems, Inc., Enterprise JavaBeans™ Specification, Version 2.1, Final Release, Nov. 12, 2003, pp. 1-646.

(Continued)

*Primary Examiner* — Li B Zhen
*Assistant Examiner* — Evral Bodden
(74) *Attorney, Agent, or Firm* — Meyer IP Law Group

(57) ABSTRACT

A system and method for dynamically generating proxy classes in order to enforce call-by-value semantics between clients and EJBs collocated with a virtual machine. The virtual machine can be a Java virtual machine (JVM) or some other type of virtual machine. The proxy classes are dynamically generated at runtime using dynamic byte code generation. Generated proxies are then interposed between a client and an EJB. The interposition of the generated proxies allows the proxies to intercept communication between the client and the EJB. The dynamically generated wrapper classes may be used in any system wherein a first entity invokes a second entity, wherein the second entity has an interface that can be retrieved or introspected and utilizes call-by-value semantics.

15 Claims, 4 Drawing Sheets

(56) References Cited

U.S. PATENT DOCUMENTS

| | | |
|---|---|---|
| 6,877,163 B1 | 4/2005 | Jones |
| 6,931,455 B1 | 8/2005 | Glass |
| 6,947,965 B2 | 9/2005 | Glass |
| 6,951,021 B1 | 9/2005 | Bodwell |
| 6,961,772 B1 | 11/2005 | Wensel |
| 6,976,029 B2 * | 12/2005 | Venkatesh et al. ............ 707/102 |
| 6,993,774 B1 * | 1/2006 | Glass ............................ 719/330 |
| 7,114,152 B2 * | 9/2006 | Hogstrom et al. ............ 717/166 |
| 7,146,399 B2 * | 12/2006 | Fox et al. ..................... 709/203 |
| 7,181,745 B1 | 2/2007 | Foti |
| 7,536,675 B2 * | 5/2009 | Gallagher .................... 717/106 |
| 7,548,830 B2 * | 6/2009 | Goebel et al. ................. 702/181 |
| 2003/0033038 A1 * | 2/2003 | Paris et al. ..................... 700/90 |
| 2004/0015832 A1 | 1/2004 | Stapp |
| 2006/0031834 A1 * | 2/2006 | Colby et al. .................. 718/100 |
| 2013/0029667 A1 * | 1/2013 | Zhu ............................... 455/438 |
| 2013/0121209 A1 * | 5/2013 | Padmanabhan et al. ...... 370/255 |

OTHER PUBLICATIONS

Uppal, Chris, "Newbie question: immutable objects in Smalltalk," Mombu the Programming Forum, http://www.mombu.com/programming/c/t-newbie-question-immutable-objects-in-smalltalk-916311.html.

* cited by examiner

DYNAMIC GENERATION OF WRAPPER CLASSES TO IMPLEMENT CALL-BY-VALUE SEMANTICS

CROSS REFERENCE TO RELATED APPLICATIONS

The present application is related to the following United States Patents and patent applications, which patents/applications are assigned to the owner of the present invention, and which patents/applications are incorporated by reference herein in their entirety:

U.S. Provisional Patent Application No. 60/450,720, entitled "A System for Dynamic Code Generation", filed on Feb. 28, 2003; and U.S. Provisional Patent Application No. 60/450,987, entitled "Dynamic Code Generation Method", filed on Feb. 28, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to automatically generating program code, and more particularly to automatically generating wrapper classes dynamically to enforce call-by-value semantics between objects collocated within an application server.

BACKGROUND OF THE INVENTION

Application server systems provide an environment that allows client applications to implement services over a server network. The application server network may include vendor resources for providing services to the client applications. One such application server system is Web Logic Server, provided by BEA Systems of San Jose, Calif.

As vendor resources and application server utilities are used by client applications, it is often necessary to introduce adapters or proxies to mediate requests between clients and application server resources. A proxy is a class that has the same interface as some other class that it is taking the place of. An adapter takes the place of some class and exposes it through a different interface. A typical application server system implements a large number of proxies as resources are invoked and other services are performed. Many of these proxies require substantial amounts of code while often utilized for limited periods of time. Thus, it is not desirable to implement the interfaces for the lifetime of the application server system.

In some systems, a client may need to invoke a method on an Enterprise Java Bean (EJB) that resides on the same virtual machine. A prior art system 100 that illustrates a typical system for handling this operation is shown in FIG. 1. FIG. 1 includes a virtual machine 110 that includes a client or caller 120 and an EJB 130. Client 120 includes stub 150. EJB 130 includes at least one method 140 and skeleton 160. In prior art systems as that shown, client 120 may invoke a method 140 on an EJB 130. Typically, the invocation request is received by a stub 150. The stub then provides the request to the EJB. When method 140 takes parameters, the EJB specification requires that the EJB be invoked using call by value symantics. Thus, a copy of the parameter must be made and passed to the EJB for the EJB method to process. These call-by-value semantics are required by EJB specifications.

One method of the prior art for complying with call-by-value semantics is illustrated in method 200 of FIG. 2. Method 200 begins with start step 205. Next, parameters are retrieved in step 210. The parameters retrieved are those required to be passed to the EJB method to be called by the client. The parameters to be passed are then marshalled into a byte array at step 220. Typically, the parameters are marshalled by a stub. The stub itself is typically generated by a command-line code generation tool. The marshalling is accomplished using Java Object Serialization techniques known to those skilled in the art. The byte array is then provided to an EJB skeleton at step 230. The skeleton then processes the byte array and unmarshalls the array at step 240. In this step, java object deserialization is used to deserialize the objects of the array. Operation of method 200 then ends at step 245. Thus, the key point is that marshalling and unmarshalling from the byte array is expensive in time and processing power. In this manner, the process of method 200 is expensive in time and processing power.

What is needed is a more efficient system and method for implementing call-by-value semantics between an EJB and an EJB method invoking client.

SUMMARY OF THE INVENTION

In one embodiment, the present invention includes a system and method for dynamically generating proxy classes in order to enforce call-by-value semantics between clients and EJBs collocated with a virtual machine. The virtual machine can be a Java virtual machine (JVM) or some other type of virtual machine that is configured to operate with the system and techniques as described herein and as known to those skilled in the art. The proxy classes are dynamically generated at runtime using dynamic bytecode generation. Generated proxies are then interposed between a client and an EJB. The interposition of the generated proxies allows the proxies to intercept communication between the client and the EJB. In another embodiment, the present invention may be used in any system wherein a first entity invokes a second entity wherein the second entity has an interface that can be retrieved or introspected and utilizes call-by-value semantics.

DETAILED DESCRIPTION

In one embodiment, the present invention includes a system and method for dynamically generating proxy classes in order to enforce call-by-value semantics between clients and EJBs collocated with a virtual machine. The virtual machine can be a Java virtual machine (JVM) or some other type of virtual machine that is configured to operate with the system and techniques as described herein and as known to those skilled in the art. The proxy classes are dynamically generated at runtime using dynamic bytecode generation. Generated proxies are then interposed between a client and an EJB. The interposition of the generated proxies allows the proxies to intercept communication between the client and the EJB. In another embodiment, the present invention may be used in any system wherein a first entity invokes a second entity, wherein the second entity has an interface that can be retrieved or introspected and utilizes call-by-value semantics.

The proxies enforce call-by-value semantics by making copies of all parameters passed from the client or caller to the EJB. The proxies take advantage of several enhancements to improve performance. One such enhancement is to pass objects in a manner custom suited to the type of object. The present invention results in a dramatic improvement in performance for clients and/or callers that invoke EJBs located in the same virtual machine.

Figure 1:
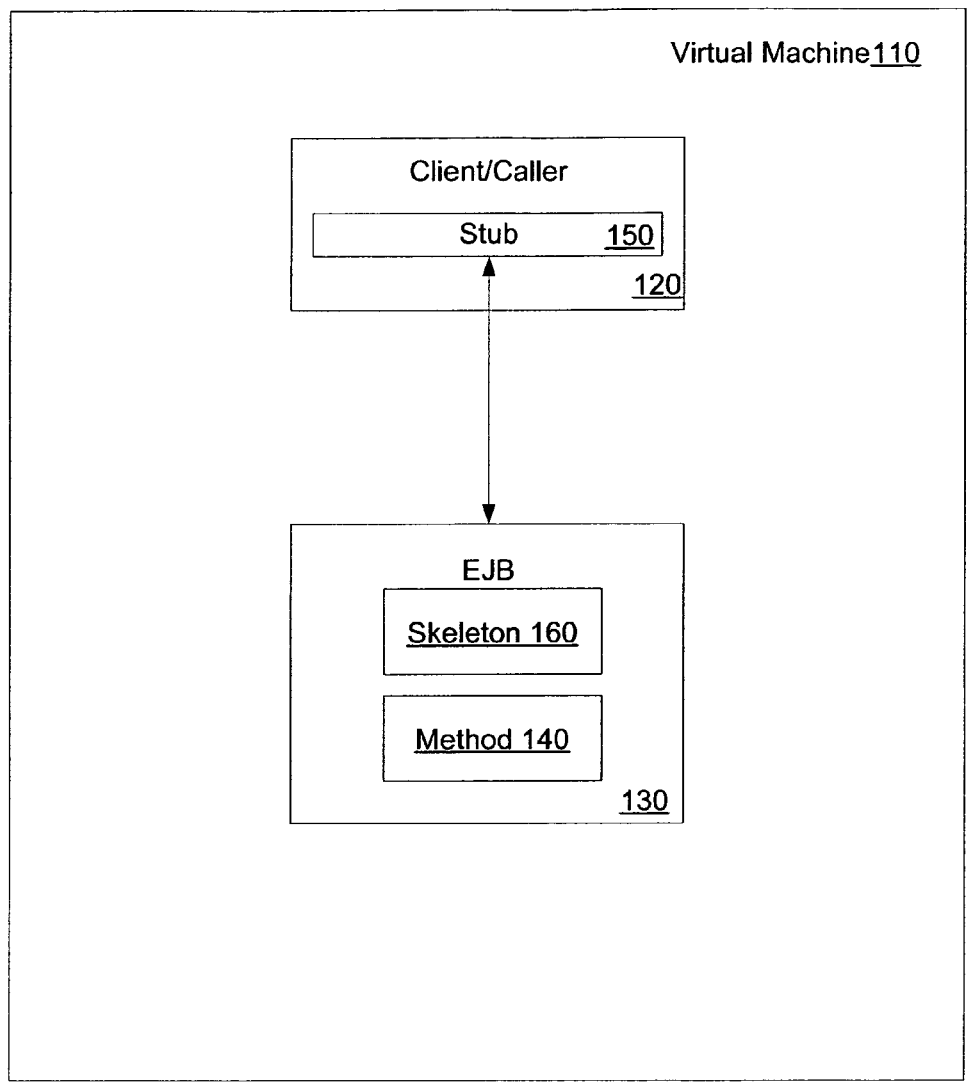
FIG. 1 is an illustration of an EJB method configured to be invoked by a client according to the prior art.
Figure 2:
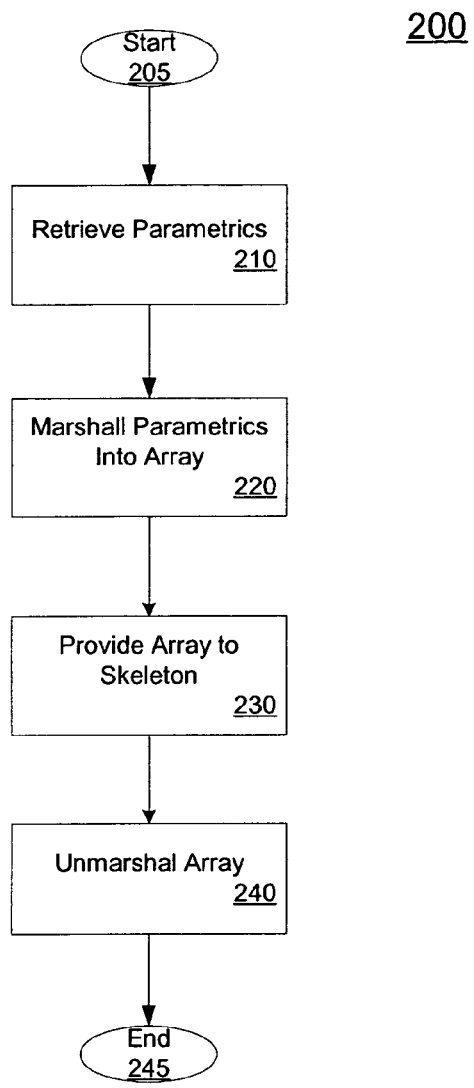
FIG. 2 is an illustration of a method for invoking an EJB method by a client according to the prior art.
Figure 3:
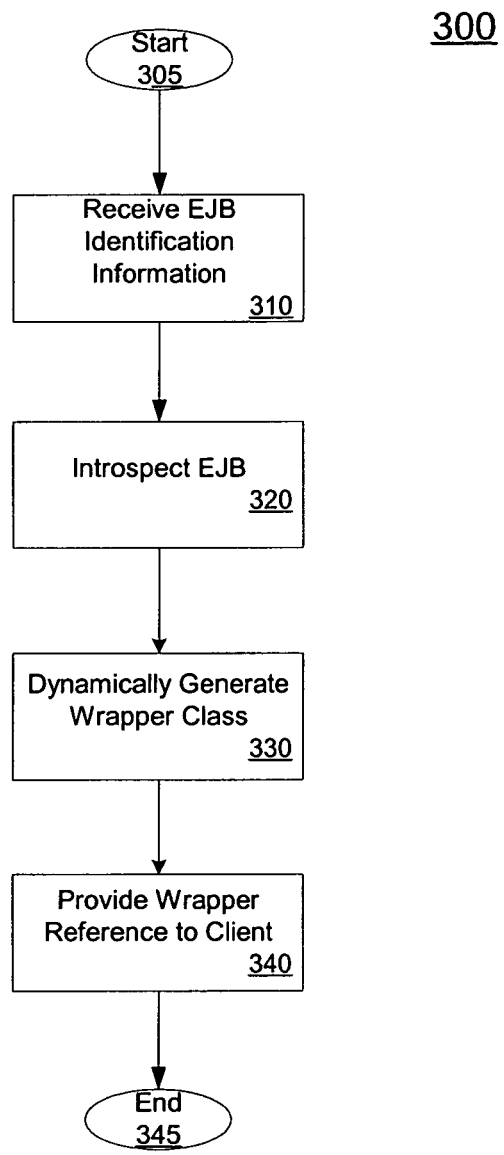
FIG. 3 is an illustration of a method for dynamically generating a wrapper class for invoking EJB methods in accordance with one embodiment of the present invention.

A method 300 for dynamically generating a wrapper class for implementing call by value semantics in accordance with one embodiment of the present invention is illustrated in FIG. 3. Method 300 begins with start step 305. Next, EJB information is received by the system in step 310. In one embodiment, receiving EJB information includes retrieving information contained in an EJB deployment descriptor, the information indicating what EJBs are to be active at start-up of the node. The EJB deployment descriptor is typically in .xml format, but may be in some other format. Next, the EJB is introspected at step 320. Introspection may be performed by java introspection techniques. The introspection of the EJB is performed to determine the EJB interfaces and what is required to communicate with the EJB interfaces. A wrapper class is dynamically generated at step 330. In one embodiment, the wrapper is co-generated on the fly before a reference to the EJB is provided to a client. The dynamically generated wrapper is configured to communicate with the EJB interface introspected in step 320. The wrapper may be dynamically generated using dynamic code generation techniques described in U.S. Provisional Patent Application No. 60/450,720, entitled "A System for Dynamic Code Generation", filed on Feb. 28, 2003, and U.S. Provisional Patent Application No. 60/450,987, entitled "Dynamic Code Generation Method", filed on Feb. 28, 2003, both currently pending and herein incorporated by reference in their entirety. A reference to the wrapper may then optionally be provided to a client at step 340. In another embodiment, the reference to the wrapper is provided to an invoking client upon invocation of the EJB to which the wrapper references. In either case, the client receives a wrapper in place of a direct reference to the EJB itself. Operation of method 300 then ends at step 345.

Figure 4:
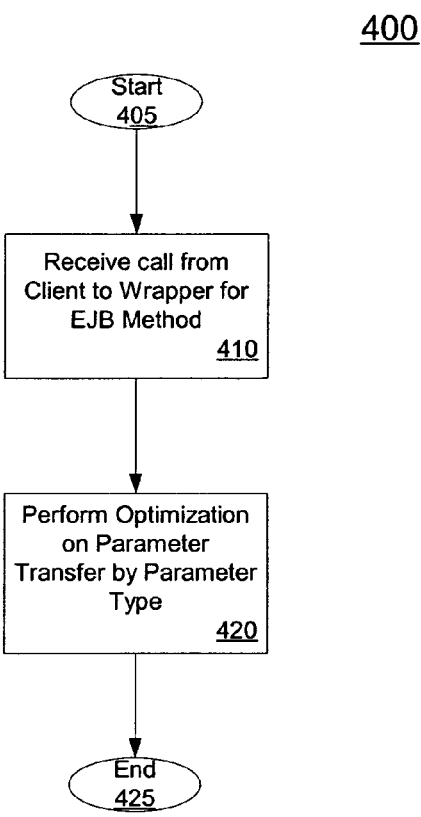
FIG. 4 is an illustration of a method invoking an EJB method using a dynamically generated wrapper in accordance with one embodiment of the present invention.

A method 400 for implementing a wrapper class is illustrated in FIG. 4. Method 400 begins with start step 405. Next, an invocation of an EJB method is received by the dynamically generated wrapper associated with the EJB in step 410. The invocation may be received from a client or some other source indicating that the client is invoking an EJB method. Next, the dynamically generated wrapper performs optimization on the parameters to be transferred in step 420.

In one embodiment, the optimization on the parameters at step 420 is based on the parameter type. If the parameter is an immutable parameter such that a deep copy is not required, then a reference to the parameter may be passed by the wrapper as a reference. Examples of these types of parameters include strings within an EJB. Parameters that are in a predictable format but are not necessarily immutable may be cloned. Examples of these type of parameters include data indicating a date. For all other parameters that can not be optimized for transfer to the requesting client, java serialization may be performed. After optimization is performed, operation ends at step 425.

The present invention includes a system and method for dynamically generating proxy classes in order to enforce call-by-value semantics between software modules. In a preferred embodiment, the present invention generates proxy classes to enforce call-by-value semantics between clients and EJBs collocated with a Java virtual machine. The proxy classes are dynamically generated at runtime using dynamic bytecode generation. Generated proxies are then interposed between a client and an EJB. The interposition of the generated proxies to allows the proxies to intercept communication between the client and the EJB. In another embodiment, the present invention may be used in any system wherein a first entity invokes a second entity wherein the second entity has an interface that can be retrieved or introspected and utilizes call-by-value semantics.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, generating wrapper classes to implement call-by-value semantics in Java virtual machines.

The invention claimed is:

1. A method for supporting method invoking between software objects, comprising:
  receiving a request, from a first software object in a first software module on a virtual machine, to access a second software object in a second software module on the virtual machine, wherein the request contains a method invocation using a parameter object and call-by-value semantics, wherein the parameter object is located in the first software module in the virtual machine;
  performing introspection on the second software object to identify one or more interfaces for communicating therewith;
  dynamically generating a wrapper object for the second software object on the virtual machine where the first software module and the second software module are collocated, wherein the wrapper object is configured to communicate with the second software object based on the one or more identified interfaces, wherein the dynamically generated wrapper object operates to
    intercept communication between the first and second software objects, and
    optimize the parameter object based on the type thereof, wherein the optimization includes
      determining if the parameter object is immutable, and if it is, passing a reference of the parameter object to the second software object, so that the second software object can access the parameter object in the software module,
      determining if the parameter object is mutable and can be cloned, and if it is, creating a clone thereof and passing the clone to the second software object, and
      determining if the parameter object is mutable but cannot be cloned, and if it cannot be cloned, serializing the parameter object and passing the serialized object to the second software object; and
  providing the first software object with a reference to the wrapper object, instead of a direct reference to the second software object, so that the first software object accesses the second software object using the wrapper object.

2. The method of claim 1, wherein the wrapper object is generated using dynamic bytecode generation as a proxy at runtime.

3. The method of claim 1, further comprising:
  retrieving information about the second software object contained in a deployment descriptor associated with the second software object.

4. The method of claim 1, wherein the reference to the wrapper object is provided to the first software object, upon invocation by the first software object of a method in the second software object to which the wrapper object references.

5. The method of claim 1, further comprising:
  receiving identification information of the second software object.

6. A non-transitory computer-readable storage medium, storing instructions for supporting communication between objects, the instructions comprising:
  receiving a request, from a first software object in a first software module on a virtual machine, to access a second software object in a second software module on the virtual machine, wherein the request contains a method invocation using a parameter object and call-by-value semantics, wherein the parameter object is located in the first software module in the virtual machine;
  performing introspection on the second software object to identify one or more interfaces for communicating therewith;
  dynamically generating a wrapper object for the second software object on the virtual machine where the first software module and the second software module are collocated, wherein the wrapper object is configured to communicate with the second software object based on the one or more identified interfaces, wherein the dynamically generated wrapper object operates to
    intercept communication between the first and second software objects, and
    optimize the parameter object based on the type thereof, wherein the optimization includes
      determining if the parameter object is immutable, and if it is, passing a reference of the parameter object to the second software object, so that the second software object can access the parameter object in the first software module,
      determining if the parameter object is mutable and can be cloned, and if it is, creating a clone thereof and passing the clone to the second software object, and
      determining if the parameter object is mutable but cannot be cloned, and if it cannot be cloned, serializing the parameter object and passing the serialized object to the second software object; and
  providing the first software object with a reference to the wrapper object, instead of a direct reference to the second software object, so that the first software object accesses the second software object using the wrapper object.

7. The non-transitory computer-readable storage medium of claim 6, further comprising
  receiving information about the second software object contained in a deployment descriptor associated with the second software object.

8. The non-transitory computer-readable storage medium of claim 6, wherein the reference to the wrapper object is provided to the first software object upon invocation by the first software object of a method in the second software object to which the wrapper object references.

9. The non-transitory computer-readable storage medium of claim 6, further comprising:
  receiving identification information of the second software object.

10. A system to support invoking between software objects, comprising:
  one or more microprocessors; and
  a virtual machine running on the one or more microprocessors, wherein a container on the virtual machine is configured to perform a method to:
    receive request, from a first software object in a first software module on a virtual machine, to access a second software object in a second software module on the virtual machine, wherein the request contains a method invocation using a parameter object and callby-value semantics, and wherein the parameter object is located in the first software module on the virtual machine, perform introspection on the second software object to identify one or more interfaces for communicating therewith, dynamically generate a wrapper object for the second software object on the virtual machine where the first software module and the second software module are collocated, wherein the wrapper object is configured to communicate with the second software object based on the one or more identified interfaces, wherein the dynamically generated wrapper object operates to intercept communication between the first software object and the second software object, and optimize the parameter object based on the type thereof, wherein the optimization includes determining if the parameter object is immutable, and if it is, passing a reference of the parameter object to the second software object, so that the second software object can access the parameter object in the first software module, determining if the parameter object is mutable and can be cloned, and if it is, creating a clone thereof and passing the clone to the another software object, and determining if the parameter object is mutable but cannot be cloned, and if it cannot be cloned, serializing the parameter object and passing the serialized object to the another software object, and provide the first software object with a reference to the wrapper object, instead of a direct reference to the second software object, so that the first software object accesses the second software object using the wrapper object.

11. The system of claim 10, further comprising, wherein the wrapper object is generated using dynamic bytecode generation as a proxy at runtime.

12. The system of claim 10, wherein the container on the virtual machine further operates to receive information about the second software object contained in a deployment descriptor associated with the second software object.

13. The system of claim 10, wherein the reference to the wrapper object is provided to the first software object upon invocation by the first software object of a method in the second software object to which the wrapper object references.

14. The system of claim 10, the container on the virtual machine further operates to receive identification information of the second software object.

15. The non-transitory computer-readable storage medium of claim 6, wherein the wrapper object is generated using dynamic bytecode generation as a proxy at runtime.

* * * * *

UNITED STATES PATENT AND TRADEMARK OFFICE
CERTIFICATE OF CORRECTION

| | | |
|---|---|---|
| PATENT NO. | : 8,881,099 B2 | Page 1 of 1 |
| APPLICATION NO. | : 10/938963 | |
| DATED | : November 4, 2014 | |
| INVENTOR(S) | : Gallagher | |

It is certified that error appears in the above-identified patent and that said Letters Patent is hereby corrected as shown below:

In the Specification

In column 2, lines 3-4, delete "call by value symantics." and insert -- call-by-value semantics. --, therefor.

In column 3, line 22, delete "call by value" and insert -- call-by-value --, therefor.

In column 4, line 2, delete "can not" and insert -- cannot --, therefor.

In the Claims

In column 5, line 61, in Claim 4, delete "object, upon" and insert -- object upon --, therefor.

Signed and Sealed this
Sixteenth Day of June, 2015

Michelle K. Lee
*Director of the United States Patent and Trademark Office*